United States Patent [19]

Koumo et al.

[11] Patent Number: 5,253,191
[45] Date of Patent: Oct. 12, 1993

[54] ELECTRONIC COMPUTER CAPABLE OF ENTERING UNARY OPERATOR USING PREFIX NOTATION

[75] Inventors: Hideyasu Koumo, Yamatokoriyama; Fumiaki Kawawaki, Nara, both of Japan

[73] Assignee: Sharp Kabushiki Kaisha, Osaka, Japan

[21] Appl. No.: 816,977

[22] Filed: Jan. 7, 1992

[30] Foreign Application Priority Data

Jan. 9, 1991 [JP] Japan ................................. 3-000913

[51] Int. Cl.$^5$ .............................................. G06F 3/00
[52] U.S. Cl. .............................................. 364/709.16
[58] Field of Search .............. 364/706, 709.01, 709.16, 364/709.12

[56] References Cited

U.S. PATENT DOCUMENTS 4,695,983  9/1987  Oda et al. ...................... 364/709.16
5,134,577  7/1992  Kawawaki ...................... 364/709.16

FOREIGN PATENT DOCUMENTS 59-220859  12/1984  Japan .

OTHER PUBLICATIONS

SHARP Programming for the Sciences: Applications for the SHARP EL-512 Scientific Calculator, 1983, pp. 38-39.

Primary Examiner—Long T. Nguyen
Attorney, Agent, or Firm—Nixon & Vanderhye

[57] ABSTRACT

An electronic computer of the invention adopts prefix unary operators, so that key operation for entering arithmetic or mathematical expressions is performed in the normal order of the operands and operators of the expression, and moreover the last calculation result can be directly used as the operand for the prefix unary operator. Therefore, sequential calculations can be performed step by step while checking the intermediate results by simple key operation.

4 Claims, 3 Drawing Sheets

ELECTRONIC COMPUTER CAPABLE OF ENTERING UNARY OPERATOR USING PREFIX NOTATION

BACKGROUND OF THE INVENTION

1. Field of the Invention

The present invention relates to an electronic computer such as a scientific electronic calculator.

2. Description of the Prior Art

In a scientific calculator which is generally used in recent years, with respect to binary operators for arithmetic operations, etc., one binary operator can be entered between two operands using infix notation in a normal expression order instead of using reverse Polish notation (postfix notation). With respect to unary operators for trigonometric functions, square roots or other operations (which are mostly referred to as functions in the calculator), since it is convenient that the calculation is performed immediately after the entry of a unary operator, the unary operator is entered after an operand (a postfix unary operator which is hereinafter referred to as "a postfix function), unlike the notation of a normal expression. In such a scientific calculator, especially when a calculation is performed by using two or more operators, it is more likely that the key depression procedure is confused due to the difference between the entry order and the order of the operands and operators of the normal expression.

As a solution of this problem, a scientific calculator has been developed in which the unary operator for the trigonometric function, square root or other operations are set as unary operators to be entered before the operand (a prefix unary operator which is hereinafter referred to as "a prefix function"), and the unary operator can be entered before the operand in accordance with the notation of the normal expression.

In such a conventional scientific calculator, as shown in FIG. 3, a key operation panel 1 is provided in the center and lower portions of the surface of the body and a liquid crystal display (LCD) panel 2 is provided in the upper portion thereof.

The key operation panel 1 includes numeric keys 11, arithmetic operation keys 12 and mathematical function keys 13 for entering an expression consisting of operands and operators. The numeric keys 11 are used for entering numeric values by respective keys [0]-[9], etc. The arithmetic operation keys 12 such as an addition [+] key 12a and a multiplication [×] key 12b are used for entering binary operators. The binary operators are entered using infix notation. The key operation panel 1 further includes operational function keys 14 for performing other operations, memory keys 15 and other keys. There is provided an equal [=] key 16 associated with the arithmetic operation keys 12. By the depression of this key, the calculation of the entered expression is performed.

The mathematical function keys 13 such as a sine [sin] key 13a and a square root [√] key 13b are used for entering unary operators, and also for entering a binary operator such as an exponent operator for calculating the xth power of y. The unary operator entered by the sine [sin] key 13a, the square root [√] key 13b, or the like is set as a prefix unary operator (a prefix function) which is entered before the operand, so that the entry order can be equivalent to the order of the operands and the operators of the normal expression. If it is natural to enter an operator such as a square operator entered by a square $[x^2]$ key 13c after the operand, the operator is set as a postfix unary operator (a postfix function). The entry order in the case where a binary operator is to be entered by one of the mathematical function keys 13 is managed the same as the entry order in the case of the arithmetic operation keys 12. Moreover, in a conventional scientific calculator, even when a unary operator is entered by one of the mathematical function keys 13, the calculation is not performed until the equal [=] key 16 is depressed.

These are provided parenthesis keys 17 associated with the mathematical function keys 13. The parenthesis keys 17 comprise a left parenthesis [(] key and a right parenthesis [)] key which are used for performing the calculation of the entered expression in accordance with a different order from the order of priority of the operator.

The operational function keys 14 include a power turn-on [ON] key 14a, a second function [2ndF] key 14b for selecting another function for each key, a delete [DEL] key 14c for editing the entered expression, and other keys. The memory keys 15 are provided for operating a memory for temporary storage, and comprise a memory [x→M] key 15a for storing the numeric value or the calculated result into a memory, a recall memory [RM] key 15b for recalling the stored numeric value, etc.

The LCD panel 2 displays an expression consisting of operands and operators entered by the above-mentioned keys or the calculated result.

Since the unary operator priority is normally set to the highest, when the result obtained by using another operator is used as the operand for the unary operator, the expression for obtaining the operand must be parenthesized. However, when the operand for the prefix unary operator is to be parenthesized, the user is forced to operate keys in the reverse order to the calculation order. This is not at all convenient, when one performs the entry while thinking the expression.

For example, in the scientific calculator shown in FIG. 3, when the result obtained by using the addition operator (+) of binary operator is used as the operand for the sine operator (sin) of prefix unary operator, as shown in Table 1, the sine [sin] key 13a is first depressed (procedure 11). Next, a parenthesized add expression is entered by using the parenthesis keys 17, numeric keys 11 and addition [+] key 12a (procedure 12). Finally, the result is obtained by depressing the equal [=] key 16 (procedure 13). In this case, the sine [sin] key 13a is first depressed and then the addition [+] key 12a is depressed, in the reverse order to the calculation order.

TABLE 1

| Procedure | Key operation | Display after the operation |
| --- | --- | --- |
| 11 | [sin] | sin_ |
| 12 | (10 + 20) | sin(10 + 20)_ |
| 13 | [=] | 0.5 |

When the result obtained by using another operator is used as the operand for the prefix unary operator as described above, it is sometimes required that the calculation using the prefix unary operator is performed after checking the result obtained by using another operator. If the result is first obtained by using another operator and then the obtained result is used as the operand for the prefix unary operator, it is necessary to enter the same numeric value as that of the result by using the numeric keys again, or it is necessary to depress the memory key for temporarily storing the obtained result into the memory or to depress a last answer key for recalling the last obtained result. This causes the key operation to be troublesome.

Specifically, in the scientific calculator shown in FIG. 3, the numeric keys 11, addition [+] key 12a and equal [=] key 16 are first operated to obtain the result of the add expression (procedure 21), as shown in Table 2. Then, the obtained result is stored in the memory once by depressing the memory [x→M] key 15a (procedure 22). After depressing the sine [sin] key 13a (procedure 23), the stored result in the memory is recalled by depressing the recall memory [RM] key 15b (procedure 24). Finally, the result is obtained by depressing the equal [=] key 16 (procedure 25). In this case, the depression of the memory keys 15 in procedures 22 and 24 is the extra operation, as compared with the case of the usual scientific calculator in which the sine operator (sin) is set as a post-fix unary operator.

TABLE 2

| Procedure | Key operation | Display after the operation |
|---|---|---|
| 21 | 10 + 20 | 30. |
| 22 | [x→M] | M 30. |
| 23 | [sin] | sin_ |
| 24 | [RM] | M sin 30._ |
| 25 | [=] | 0.5 |

As a result, in the conventional scientific calculator to which an expression can be entered in the order of normal notation, when a complicated calculation which necessitates parentheses is to be performed, or when it is required to sequentially calculate checking the results step by step, there arises a problem in that the key operation becomes troublesome.

Even in a conventional scientific calculator as shown in FIG. 3, when the add calculation is performed (procedure 31) and then the multiplication operator of binary operator is entered by depressing the multiplication [×] key 12b (procedure 32), the result from the above add calculation can be directly used as the first operand for the multiplication operator, for example as shown in Table 3.

TABLE 3

| Procedure | Key operation | Display after the operation |
|---|---|---|
| 31 | 10 + 20 = | 30. |
| 32 | [×] | 30.x_ |

In another case, where a square operator of postfix unary operator is entered by depressing the square [$x^2$] key 13c (procedure 42) after the add calculation is performed (procedure 41), for example as shown in Table 4, the result from the above add calculation can be directly used as the operand for the square operator.

TABLE 4

| Procedure | Key operation | Display after the operation |
|---|---|---|
| 41 | 10 + 20 = | 30. |
| 42 | [$x^2$] | $30.^2$_ |

SUMMARY OF THE INVENTION

The electronic computer of this invention, which overcomes the above-discussed and numerous other disadvantages and deficiencies of the prior art, receives an operator and also an operand entered before or after said operator depending on the kind of said operator and comprises calculation execution means for, when a key operation making a signal for the start of calculation is performed, performing the calculation of the entered expression, and in which one or more unary operators are set as prefix unary operators to be entered before an operand, and said electronic computer further comprises: calculation identification means which includes a status indicative of the completion of the calculation performed by said calculation execution means; first judgement means for judging whether said prefix unary operator is entered into said calculation execution means or not; second judgment means for judging whether said status of said calculation identification means is set or not; operand entry means for, when said calculation identification means is in said status and said prefix unary operator is entered into said calculation execution means, the immediately preceding calculation result is entered into said calculation execution means as the operand for said prefix unary operator; and reset means for, when any entry is performed into said calculation execution means, resetting said status of said calculation identification means.

In a preferred embodiment, the electronic computer further comprises: calculation order determination means for determining order of execution of calculation based on priority when said key operation making a signal for the start of calculation is performed.

In a preferred embodiment, the electronic computer further comprises: editing means for editing arithmetic or mathematical expression entered before said key operation making a signal for the start of calculation is performed.

In a preferred embodiment, the electronic computer further comprises: first memory means for storing said arithmetic or mathematical expression into memory temporarily; and second memory means for recalling said arithmetic or mathematical expression stored by said first memory means from said memory.

The calculation execution means receives an operator entered by the key operation and also receives an operand entered by the key operation or an operand based on the result of the previous calculation. The entry order of the operator and operand is predetermined according to the kind of the operator. A binary operator is usually entered between the two operands in accordance with infix notation. A unary operator may be entered before the operand in accordance with prefix notation or after the operand in accordance with postfix notation. In the electronic computer of the invention, one or more unary operators are set as prefix unary operators to be entered before the operand. Therefore, if a unary operand for trigonometric function, square root or other operations is set as the prefix unary operator, the entry can be performed by the key operation in the order of normal expression notation. The operand may be the value recalled by the depression of a key (a recall memory key, a last answer key, a scientific constant recall key, etc.), other than the value directly entered by the depression of numeric keys. When an operator permits the entry of the operand before the operator itself, the numeric value which is already obtained as a result of the previous calculation can be used as the operand. Moreover, when a plurality of operators are to be entered before the depression of a key making a signal for the start of the calculation, the result obtained by using the operator to be calculated earlier can be used as the operand for the operator to be calculated later. The calculation order in this case is determined by the parentheses, the priority of the operator and the associative law (normally, the calculation is performed in accordance with the entry order).

The calculation execution means starts the calculation by the depression of the key making a signal for the start of the calculation. The signal for the start of the calculation is generally made by the depression of an equal [=] key in the scientific calculator in which the key operation is performed in the order of the notation of the operands and operators of the expression, but the signal for the start of calculation can be made by another kind of key.

In the above construction of the invention, when the calculation execution means performs the calculation, the calculation identification means becomes in the status indicative or calculating. When any entry is performed into the calculation execution means, the reset means resets the status of the calculation identification means. Therefore, the calculation identification means is in the set status only immediately after performing the calculation by the calculation execution means. The calculation identification means may be a flag, and, may indicate its set/reset status determined by whether a predetermined value is written into a predetermined area of a semiconductor memory device or not. The calculation identification means may indicate its set/reset status by using program routines different from each other.

When the calculation identification means is in the set status, and a prefix unary operator is entered into the calculation execution means, the operand entry means then enters the result of the last calculation into the calculation execution means as the operand for the prefix unary operator. When the calculation identification means is in the reset status, and a prefix unary operator is entered into the calculation execution means, it is necessary to enter the operand by the key operation as in the prior art.

As a result, immediately after performing the calculation, only by entering a prefix unary operator, the result of the last calculation can be used as the operand for the prefix unary operator.

Thus, the invention described herein makes possible the objectives of (1) providing an electronic computer such as a scientific electronic calculator which, when a prefix unary operator is entered immediately after performing the calculation, uses the result of the calculation as the operand for the prefix unary operator, thereby being capable of entering an expression in accordance with the normal order of the notation of the operands and operators; and (2) providing an electronic computer by which the operation for sequentially calculating step by step can readily be performed.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
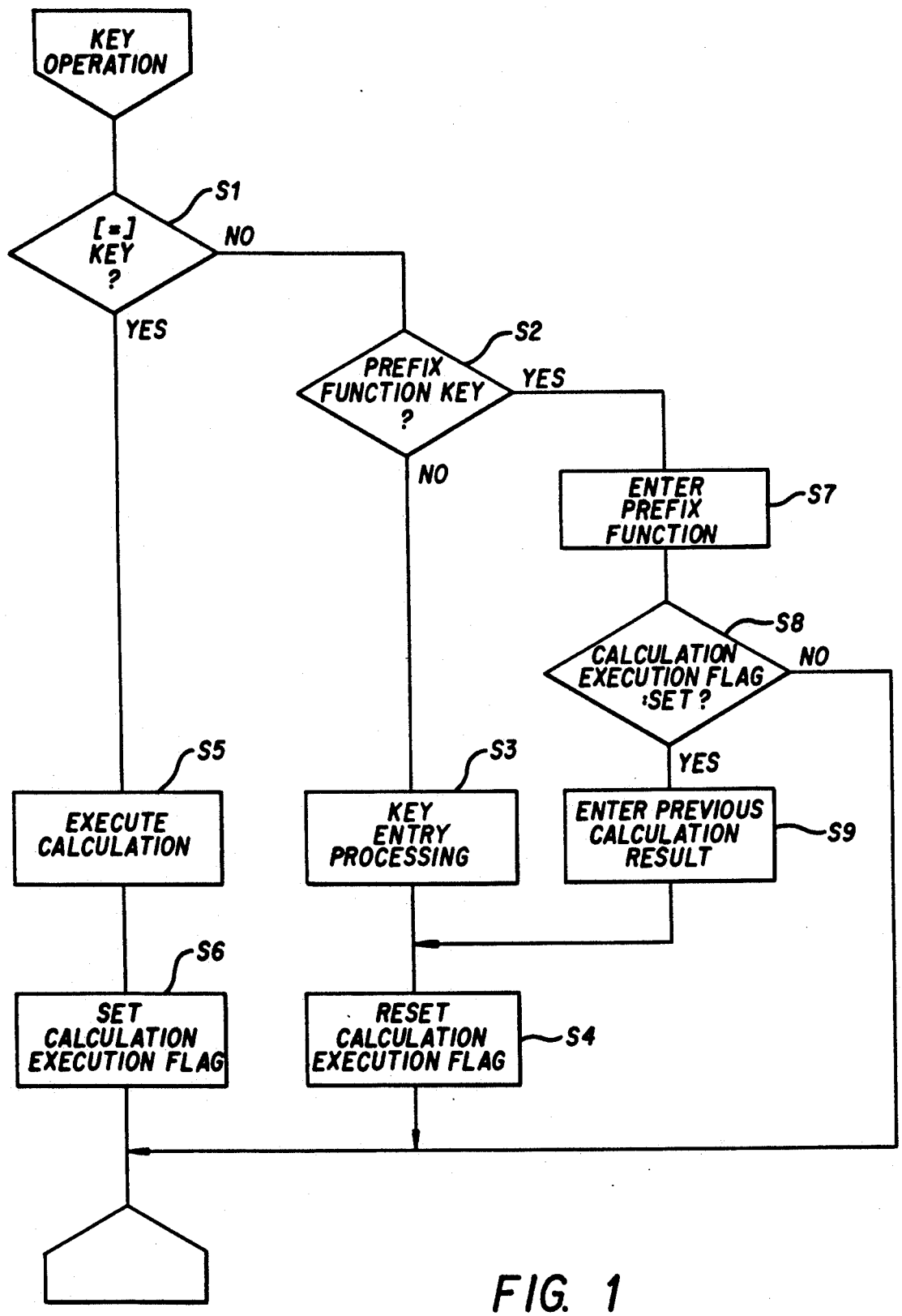
FIG. 1 is a flowchart illustrating the operation when the key operation is performed in a scientific calculator according to the invention.
Figure 2:
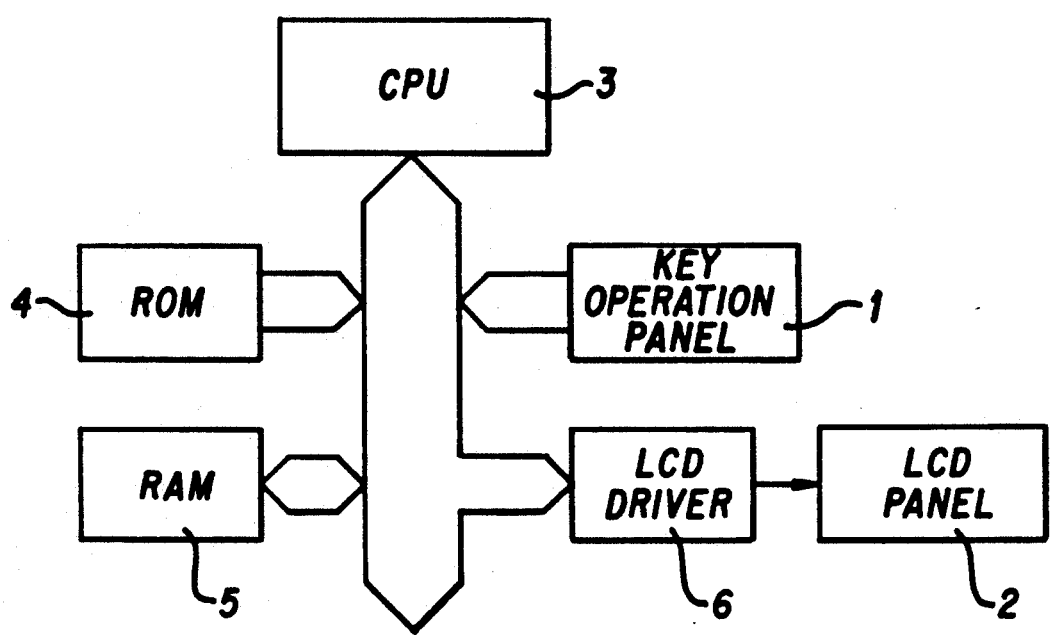
FIG. 2 is a block diagram showing the configuration of the scientific calculator shown in FIG. 1.

FIGS. 1 and 2 show an embodiment in which the invention is applied to a scientific calculator. FIG. 1 is a flowchart illustrating the operation when the key operation is performed in the scientific calculator, and FIG. 2 is a block diagram showing the configuration of the scientific calculator.

In the scientific calculator of this embodiment, unary operators for performing the calculation of trigonometric function, square root or other mathematical functions are set as prefix unary operators to be entered before the operand, i.e., in the same order as the order of the operands and operators of the normal expression. The external appearance of the scientific calculator is equivalent to that of the conventional scientific calculator shown in FIG. 3, and respective keys and the others are represented by the same reference numerals. Therefore, the description of the reference numerals is omitted.

Figure 3:
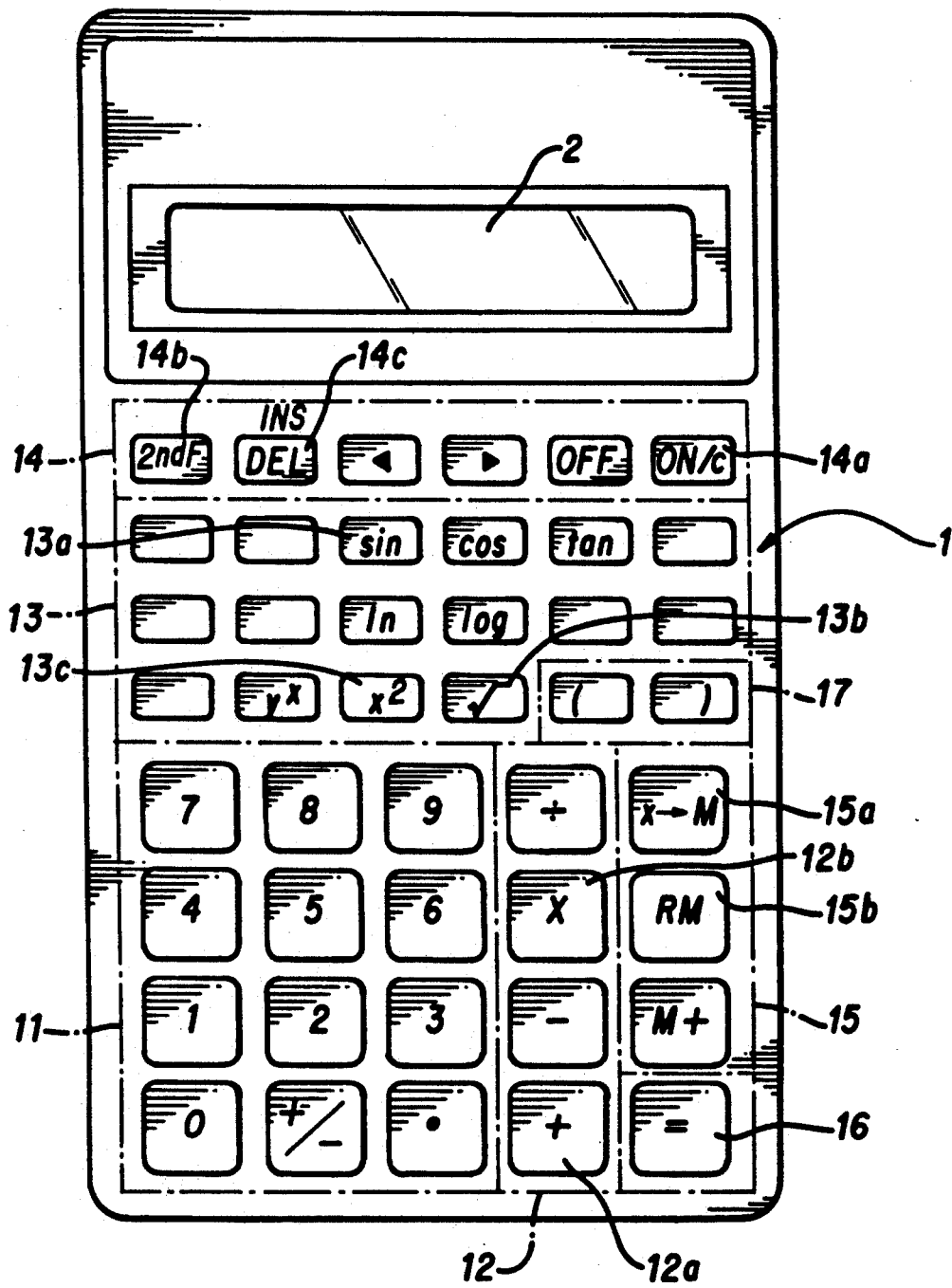
FIG. 3 is a plan view of a scientific calculator.

The scientific calculator comprises a computer system with a CPU 3, as shown in FIG. 2. To the CPU 3, a ROM 4 and a RAM 5 are connected via a bus. The ROM 4 stores programs for performing calculations and other programs for performing respective functions of the calculator. The RAM 5 is utilized as a work area for the programs for performing calculations, etc., and the value to be stored temporarily by the operation of the memory keys 15 and the value of the calculation execution flag are also stored in the RAM 5. The key operation panel 1 and the LCD panel 2 via an LCD driver 6 which are shown in FIG. 3 are also connected to the CPU 3. The CPU 3 reads the key depressed by the key operation panel 1 and displays information on the LCD panel 2 in accordance with the programs stored in the ROM 4.

The programs for performing calculations stored in ROM 4 is programmed so that operators and operands entered by the key operation panel 1 are stored in the form of an expression in the order of entry on the work area in the RAM 5. During the entry operation, if the delete [DEL] key 14c shown in FIG. 3 is depressed, the expression stored on the work area is edited in accordance with the corresponding key function. If the equal [=] key 16 is depressed, in accordance with the programs for performing calculations, the CPU 3 analyzes the expression stored on the work area and determines the calculation order based on the priorities of the parentheses and the operators. The CPU 3 further performs the calculation in the determined order. The LCD panel 2 displays the expression stored on the work area and the calculation result.

The operation of the scientific calculator of the above configuration, when the key operation panel 1 is operated, will be described with reference to the flowchart of FIG. 1 and Table 5 shown below.

TABLE 5

| Procedure | Key operation | Display after the operation |
| --- | --- | --- |
| 1 | 10 + 20 | 10 + 20_ |
| 2 | [=] | 30. |
| 3 | [sin] | sin30._ |
| 4 | [=] | 0.5 |

When the key operation panel 1 is operated, the CPU 3 judges whether the equal [=] key 16 is depressed or not, in step S1 in FIG. 1. If any other key is depressed, it is judged whether or not the depressed key is any one of the prefix unary operator (hereinafter, referred to as "prefix function") keys such as the sine [sin] key 13a (step S2). If the depressed key is not any one of the prefix function keys, and the key operation is performed for entering an operand, an operator or a parenthesis, the CPU 3 stores it into the RAM 5 as information for performing the calculation. If the depressed key is one of the operational function keys 14 or other keys, the corresponding processing is performed (step S3). After completing the processing, the CPU 3 resets the calculation execution flag (step S4) and terminates the processing. Accordingly, if the numeric keys 11 and the addition [+] key 12a are depressed in procedure 1 of Table 5, an expression "10+20" is stored into the RAM 5 in the processing of step S3, and the expression is displayed on the LCD panel 2. The reset processing of the calculation execution flag in step S4 is performed by storing a predetermined value in the area on RAM 5 for the corresponding calculation execution flag.

In step S1, if the equal [=] key 16 is depressed, the CPU 3 performs the calculation of the entered expression (step S5), and then the CPU 3 sets the calculation execution flag (step S6) and terminates the processing. Therefore, in procedure 2 of table 5, when the equal [=] key 16 is depressed, the abovementioned expression "10+20" is calculated by the processing of step S5. On the LCD panel 2, the expression is cleared and the calculated result "30" is displayed. In step S6, the set processing of the calculation execution flag is performed by storing a value different from the predetermined value used in the reset processing into the work area in RAM 5 for the corresponding calculation execution flag.

In step S2, if one of the prefix function keys is depressed, the prefix function is entered into the RAM 5 (step S7) and the CPU 3 judges whether the calculation execution flag is in the set status or not (step S8). If the calculation execution flag is judged to be in the reset status, the CPU 3 terminates the processing. Accordingly, the CPU 3 requires the entry of the operand after the prefix function. If the key operation is performed immediately after executing the calculation and the calculation execution flag is in the set status, the last calculation result is entered into the RAM 5 as the operand for the prefix function (step S9). Then, the process proceeds to step S4 in which the calculation execution flag is reset, and the CPU 3 terminates the processing. Therefore, in procedure 3, when the sine [sin] key 13a is depressed, the expression "sin 30" is entered into the RAM 5 by the processing of step S9. Then, the last calculation result is cleared and this expression is displayed on the LCD panel 2. Furthermore, in procedure 4, when the equal [=] key 16 is depressed again, the calculation "sin 30" is performed by the processing of step S5, and the calculation result "0.5" is displayed on the LCD panel 2. When other keys than the equal [=] key 16 are operated, operators or operands can be entered succeedingly.

As a result, in the scientific calculator of this embodiment, immediately after the calculation by the depression of the equal [=] key 16, only by operating one of the prefix function keys such as the sine [sin] key 13a, the last calculation result can be used as the operand for the prefix function.

As apparent from the above description, the electronic computer of the invention adopts prefix unary operators, so that the key operation for entering an expression is performed in the normal order of the operands and operators of the expression, and moreover the last calculation result can be directly used as the operand for the prefix unary operator. Therefore, sequential calculation can be performed step by step while checking the intermediate results by simple key operation.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An electronic computer which receives an operator and also an operand entered before or after said operator depending on which kind of said operator and comprises calculation execution means for, when a key operation making a signal for the start of calculation is performed, performing the calculation of an entered expression, and in which one or more unary operators are set as prefix unary operators to be entered before an operand, said electronic computer further comprising:
   calculation identification means which includes a status indicative of the completion of the calculation performed by said calculation execution means;
   first judgment means for judging whether one or more of said prefix unary operators is entered into said calculation execution means or not;
   second judgment means responsive to said calculation identification means for judging whether said completion status of said calculation identification means is set or not;
   operand entry means for, when said calculation identification means is in said status and said prefix unary operator is entered into said calculation execution means, entering the immediately preceding calculation result into said calculation execution means as the operand for said prefix unary operator; and
   reset means for, when any entry is performed into said calculation execution means, resetting said status of said calculation identification means.

2. An electronic computer of claim 1 further comprising:
   calculation order determination means for determining order of execution of calculation based on priority when said key operation making a signal for the start of calculation is performed.

3. An electronic computer of claim 2 further comprising:
   editing means for editing arithmetic or mathematical expression entered before said key operation making a signal for the start of calculation is performed.

4. An electronic computer of claim 3 further comprising:
   first memory means for storing said arithmetic or mathematical expression into a memory temporarily; and
   second memory means for recalling said arithmetic or mathematical expression stored by said first memory means from said memory.

* * * * *